Aug. 18, 1942.  W. T. WHITTINGSLOWE  2,293,582
BALL AND SOCKET JOINT
Filed Oct. 30, 1939
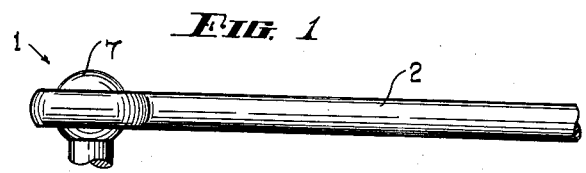
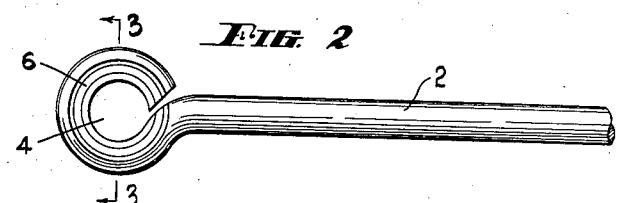
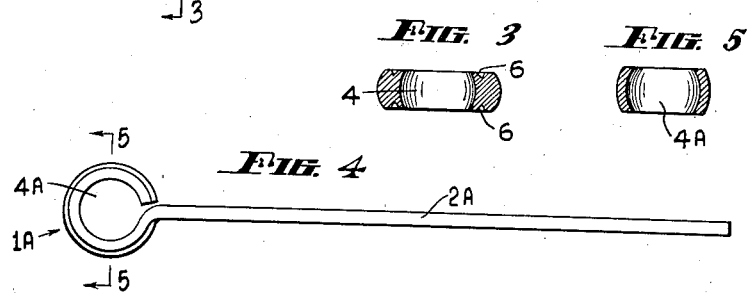
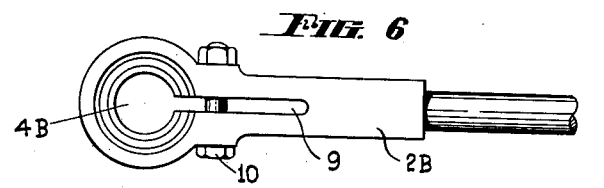
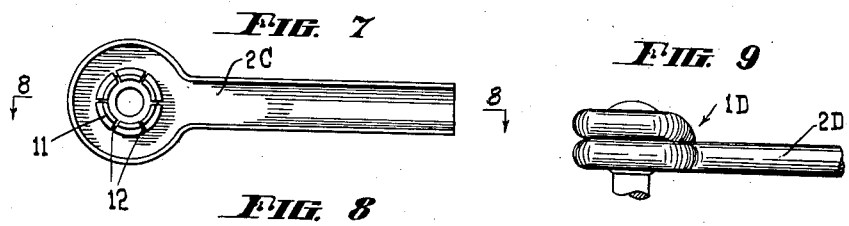
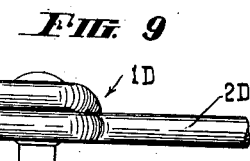
Inventor:
William Thomas Whittingslowe
by John Todd
Att'y.

Patented Aug. 18, 1942

2,293,582

UNITED STATES PATENT OFFICE 2,293,582

BALL AND SOCKET JOINT

William Thomas Whittingslowe, New Mile End, South Australia, Australia, assignor to Carr Fastener Company of Australia Limited, Royal Park, State of South Australia, Australia, a company of the State of South Australia Application October 30, 1939, Serial No. 301,876
In Australia November 14, 1938

2 Claims. (Cl. 287—90)

This invention relates to improvements in ball and socket joints the object being to provide a joint which will be simple and effective.

The joint is especially applicable to small fittings such as are used for instance for connecting up the arms of wind screen wipers of cars, but it may be used on larger mechanisms. Apart from its use for connecting up mechanical moving parts it is also useful for connecting electric cables to terminals such as for connecting the ignition wires to a spark plug.

According to my invention the socket is formed by pressing an eye around a ball to shape the inner wall of such eye, said socket being of one piece and being expansible to permit it to be withdrawn from the shaping ball, and being sprung onto the ball with which it is associated.

The invention can take various forms but possibly the most useful of these is one in which the socket is formed upon the end of a bar by bending such end to form an eye which is then shaped by pressing such eye around a shaping ball and then withdrawing the shaping ball, tempering the socket, and springing it on to the ball with which it is to be associated.

The invention will however be better understood from the following description which will be made with reference to the accompanying drawing in which:

Fig. 1 shows in side elevation one embodiment of the invention.

Fig. 2 is a plan of the socket member.

Fig. 3 is a section on line 3—3 of Fig. 2.

Fig. 4 is a plan showing the socket member formed from a flat as opposed to a round piece of material.

Fig. 5 is a section on line 5—5 of Fig. 4.

Fig. 6 is a plan of a modified socket member utilizing a bolt to prevent the socket from expanding after it is sprung on to the ball.

Fig. 7 is a further modification showing a light metal pressing suitable for use in connecting the wires to spark plugs and for such like purposes.

Fig. 8 is a section of same on line 8—8 of Fig. 7.

Fig. 9 is a side elevation of a further modification corresponding somewhat to that shown in Fig. 1 but having the eye formed by two revolutions of the bar, and Fig. 10 is a plan of the socket member only.

Describing first the form shown in Figs. 1, 2 and 3.

The socket 1 is formed by bending the end of a round bar 2 to form an eye 4. This eye is after forming drilled out to a diameter approximately equal to the diameter of the ball with which such socket is to be associated and a forming ball is then located in such eye with its centre in the plane of the bar axis and dies are used to force the wall of the eye around the middle portion of the ball. This forming can best be achieved by making concentric indentations 6 in the upper and lower surfaces of the eye wall which indentations will force the metal to partly surround the ball as shown more particularly in Fig. 3. The forming ball is now removed and if it is found that the eye has been slightly opened during this removal it is closed to correct diameter and the bar is then tempered to prevent further distortion of the eye due to the springing in of the ball 7 with which the so formed socket is to be associated.

Instead of using a round bar a bar of square or other configuration can be used, and in the case of a square or rectangular bar it is not necessary to drill the eye to initially form the walls as the already flat portion of the bar would be suitable for forming around the shaping ball.

A socket 1A formed of a flat bar 2A is shown in Figs. 4 and 5, the eye being indicated by 4A.

According to a further modification instead of bending the end of a bar to form the eye such eye 4B is formed in a flat strip-like member 2B which is provided with a slot 9 to give to the eye sufficient resilience to allow the said springing to take place. The eye is again shaped in the same manner as with the embodiments above described. A bolt 10 is shown the purpose of which is to prevent expansion of the socket after it is sprung in place on a ball, but this bolt can if desired be omitted.

According to the modification shown in Figs. 7 and 8 the member 2C is formed of sheet metal as shown, the eye 4C being formed by drawing downward portion of the metal to form a wall 11 and then shaping it around a ball to give it the correct configuration, slots 12 being provided in the wall to allow the shaping ball to be withdrawn and the ball with which it is to be associated to subsequently be sprung into the socket so formed, the socket member or wall 11 being hardened or tempered after shaping so that it will retain its correct configuration when sprung on to the ball with which it is to be associated. The member may be secured to a bar or it may have ignition wires or suchlike secured to it depending upon the use to which it is to be put.

According to the modification shown in Figs. 9 and 10 the socket 1D is formed from a bar 2D while the eye 4D is formed by winding the bar around for approximately two revolutions so that the one part will engage the ball above the middle portion thereof and the other part will engage the ball below the middle portion. In this way each revolution has the required flexibility to allow expansion, and the distance between the two parts will also be slightly expansible so that the ball can be held very firmly if required. This type of ball and socket can be formed of bars other than round, for instance flat bars.

In operation a socket formed according to this invention has an inner configuration which corresponds to the configuration of the ball with which it is used and engages the middle portion of such ball over a large area, providing an excellent bearing surface between the ball and the socket and thus making a sure and reliable connection. Instead of forming the devices from metal other resilient materials can be used and it would for instance be possible to use plastics in which case the plastic would be moulded around the middle portion of a forming ball and would be shaped or slotted to allow the required expansion to allow its withdrawal from the shaping ball and springing on to the ball with which it is eventually associated.

What I claim is:

1. A ball and rocket joint comprising in combination, a socket and a ball in snap fastener engagement within said socket, said socket being formed from a solid rod-like member having an eye formed at one end, a portion of said eye being laterally yieldable and having a wall surrounding an aperture through said eye, said wall being shaped to provide a portion of smaller diameter than the largest diameter of said ball at each end of said aperture through the eye so that said ball may be snapped into engagement with said eye from either side.

2. A ball and socket joint comprising in combination a socket device and a ball in snap fastener engagement within said socket device, said socket device comprising a shaft having its free end bent in a substantial ring to form a resilient eye, said ring having its free end adjacent the junction of said bent portion and said shaft and spaced from said shaft to permit expansion and contraction of said eye when being attached to or detached from said ball.

WILLIAM THOMAS WHITTINGSLOWE.